UNITED STATES PATENT OFFICE.

HERMANN BOLLMANN, OF HAMBURG, GERMANY.

MANUFACTURE OF FOODSTUFFS.

1,260,656.  Specification of Letters Patent.  Patented Mar. 26, 1918.

No Drawing.  Application filed January 3, 1918.  Serial No. 210,221.

*To all whom it may concern:*

Be it known that I, HERMANN BOLLMANN, a citizen of Hamburg, German Empire, residing at Hamburg, Germany, have invented certain new and useful Improvements in or Relating to the Manufacture of Foodstuffs, of which the following is a specification.

It has heretofore been proposed to treat oil-bearing seeds with benzol and benzin for the production of the oil and of albuminous foodstuffs. It has also been proposed to employ concentrated and diluted alcohol for the removal of the oils and of the bitter substances. Moreover, it is not novel to employ for this purpose primarily alcohol and subsequently to effect extraction with ether or a hydrocarbon. It has further been suggested to remove the bitter taste from yeast and thereby to render it suitable for human consumption by extraction with alcohol. The yeast thus treated, however, still possesses a repulsive taste caused by the oil contained therein.

By extraction with hydrocarbons the oil only is removed; ether is out of the question in practice for commercial working because, apart from the great danger of fire, its use as a solvent (on a factory scale) is connected with considerable unavoidable losses so that it is not economical. Diluted alcohol dissolves the free fatty acids and bitter substances, but it leaves the neutral fat undissolved.

The removal of the neutral fat, free fatty acids and bitter substances may, it is true, be attained by treating the oil seeds and the yeast successively with alcohol and benzol or the like. This mode of treatment, however, has the great drawback that the diluted alcohol dissolves not only the bitter substances but also the whole of the carbohydrates which are essential for the nutritive properties and the taste of the product to be obtained. Moreover, in this process duplicate extraction devices are necessary and the solvent must be removed twice from the extraction material.

Now, I have found that, in addition to considerably simplifying the working, a considerable progress is attained by extracting the oil-containing seeds, seed sprouts and like substances as well as the yeast, with a mixture of alcohol and benzol, or alcohol and benzin, or alcohol and a chlor-substituted hydrocarbon, preferably while hot. These solvent mixtures possess the surprising property of dissolving fat and bitter substances simultaneously while leaving the bulk of the carbohydrates and particularly sugar undissolved.

If it is a question of treating seeds rich in oil, they are preliminarily pressed in a known manner and then extracted. Where the contents in oil are less, the extraction may take place straight away (*i. e.* without the preliminary pressing operation). After completion of the extraction process, the residue is separated from the solvents in a known manner.

From pig nuts, soja beans, copra, cotton seed flour, etc., tasty powders are thus obtained for manifold use. Cocoanut cakes lose their typical unpleasant smell and enable a soft white flour to be obtained. Yeast treated in this manner possesses a neutral agreeable taste and can be consumed as such or jointly with other substances in the prepartion of food and the like.

Moreover, it has been found that, in using this process it is possible to obtain a high quality of food material from fish.

Fish bodies are, for this purpose, dried *in vacuo*, for example, whole or in disintegrated and boned condition and ground up to a more or less fine powder. The fish meal thus obtained is extracted with a solvent and the residue is separated from the remainder of the solvent.

Example 1: 100 kg. soja beans are cleaned, carefully selected, slightly roasted, and then dry-pressed in a known manner. The material is then extracted hot with 200 kg. of a solvent mixture containing 120 kg. benzol and 80 kg. alcohol of 96 vol. per cent. The saturated solution is decanted and renewed until, on evaporation, the liquid leaves no residue.

Example 2: 100 kg. maize in a purified and ground condition is extracted with a mixture of 120 kg. carbon tetrachlorid and 80 kg. of alcohol of 96 vol. per cent. until, on volatilization, the solvent leaves no residue.

Example 3: 100 kg. yeast is extracted with a mixture of 200 kg. composed of 100 kg. of benzol and 100 kg. of 96 vol. per cent. alcohol. The extraction takes place with the generation of heat and is continued until the solvent leaves no evaporation residue. After the extraction is completed the yeast is separated from the solvent in a known manner and dried.

Example 4: 100 kg. of dried and ground fish is extracted with a mixture of 120 kg. carbon tetrachlorid and 80 kg. of 96 vol. per cent. alcohol. The extract is decanted and this is continued until the liquid leaves no residue on evaporation. The remaining flour is then separated from the remainder of the solvent in an appropriate manner.

The term "oil" as herein employed is intended to cover both liquid oils and solid oils, both of a fatty nature.

What I claim is:

1. A process of removing oily substances and bitter substances from solid food material containing such substances, and of which material, the residue left after removing such substances is suitable for use as a food-stuff, which process comprises removing the said substances therefrom by leaching the material, in a heated condition, with a solvent comprising alcohol and a volatile liquid hydrocarbon which is a fat solvent.

2. A process of removing oily substances and bitter substances from solid food material containing such substances, and of which material, the residue left after removing such substances is suitable for use as a food-stuff, which process comprises removing the said substances therefrom by leaching the material, in a heated condition, with a solvent comprising alcohol and benzol.

3. A process of removing oily substances and bitter substances from the press cake of oil-bearing seeds which comprises leaching such material with a solvent mixture comprising alcohol and benzol.

In testimony whereof I affix my signature.

HERMANN BOLLMANN.